United States Patent [19]
Dexter et al.

[11] 3,779,945
[45] *Dec. 18, 1973

[54] MIXTURES OF 3-(3,5-DIALKYL-4-HYDROXYPHENYL)-PROPIONIC ACID ESTERS OF ALKANEDIOLS

[75] Inventors: Martin Dexter, Briarcliff Manor; John D. Spivack, Spring Valley; David H. Steinberg, Bronx, all of N.Y.

[73] Assignee: Ciba-Geigy Corporation, Ardsley, N.Y.

[*] Notice: The portion of the term of this patent subsequent to Feb. 22, 1989, has been disclaimed.

[22] Filed: Oct. 9, 1970

[21] Appl. No.: 79,621

Related U.S. Application Data

[63] Continuation-in-part of Ser. No. 861,475, Sept. 26, 1969, Pat. No. 3,644,482, which is a continuation-in-part of Ser. No. 359,460, April 13, 1964, abandoned, which is a continuation-in-part of Ser. No. 276,192, April 29, 1963, abandoned, which is a continuation-in-part of Ser. No. 164,618, Jan. 5, 1962, abandoned, which is a continuation-in-part of Ser. No. 148,738, Oct. 30, 1961, abandoned.

[52] U.S. Cl............... 252/404, 44/70, 99/163, 260/45.85, 260/473 S, 260/666.5, 260/810
[51] Int. Cl............................................. B01j 1/16
[58] Field of Search ................ 260/473 S; 252/404; 200/404

[56] References Cited
UNITED STATES PATENTS
3,285,855  11/1966  Dexter et al..................... 260/473 S

FOREIGN PATENTS OR APPLICATIONS
288,839  10/1965  Australia ....................... 260/473 S

*Primary Examiner*—Lorraine A. Weinberger
*Assistant Examiner*—John F. Terapane
*Attorney*—Karl F. Jorda and Bruce M. Collins

[57] ABSTRACT

Mixtures of 3-(3,5-dialkyl-4-hydroxyphenyl)-propionic acid esters are stabilizers of organic material against thermo-oxidative ageing. They are prepared by conventional esterification techniques. A typical embodiment is a mixture of 2,2,4-trimethyl-1,6-hexanediol bis[3-(3,5-di-t-butyl-4-hydroxyphenyl)propionate] and 2,4,4-trimethyl-1,6-hexanediol bis[3-(3,5-di-t-butyl-4-hydroxyphenyl)propionate].

6 Claims, No Drawings

MIXTURES OF 3-(3,5-DIALKYL-4-HYDROXYPHENYL)-PROPIONIC ACID ESTERS OF ALKANEDIOLS

CROSS-REFERENCE

This is a continuation-in-part of Ser. No. 861,475 filed Sept. 26, 1969 now U.S. Pat. No. 3,644,482. Ser. No. 861,475 is a continuation-in-part of Ser. No. 359,460, filed Apr. 13, 1964, now abandoned, which is a continuation-in-part of Ser. No. 276,192 filed Apr. 29, 1963, now abandoned, which is a continuation-in-part of Ser. No. 164,618 filed Jan. 5, 1962, now abandoned, which is a continuation-in-part of Ser. No. 148,738, filed Oct. 30, 1961, now abandoned.

DETAILED DESCRIPTION

The present invention pertains to a physical mixture comprising (a) a compound of the formula:

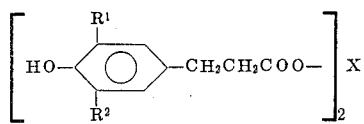

with (b) a compound of the formula:

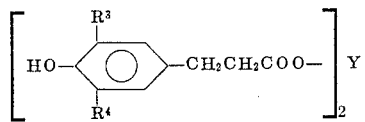

wherein
each of $R^1$ and $R^3$, independent of the other, is methyl, isopropyl, sec.-butyl or tert.-butyl;
each of $R^2$ and $R^4$, independent of the other, is isopropyl, sec.-butyl or tert.butyl; and
X and Y are non-identical aliphatic hydrocarbon groups of from three to 18 carbon atoms and having two free non-geminal valence bonds.

The mixtures of the present invention thus contain 3-(3,5-dialkyl-4-hydroxyphenyl)propionic acid esters of at least two non-identical alkanediols. The alkane diols will have from three to 18 carbon atoms, preferrably three to 12, and may simply be structurally different, e.g., in carbon atom content. Alternatively the alkane diols may have the same number of carbon atoms with the hydrocarbon chains differing in their branching so that as a result, each is a structural isomer of the other. Finally the alkanediols may have the same carbon content and the same branching but possess two centers of asymmetry and are diastereoisomers of each other. The groups X and Y are derived from and correspond structurally to the hydrocarbon residue of the alkanediols.

The ratio of the two components of this mixture can vary from 1:1 to 9:1. When X and Y differ solely by reason of diastereoisomerism, this ratio is preferrably about 1:1; otherwise the range is preferably from about 1:1 to 3:1.

In addition to differing by reason of the alkanediol hydrocarbon structure, the two components can optionally differ in the nature of the substituents $R^1$ and $R^2$ on one hand and $R^3$ and $R^4$ on the other.

Preferred are compounds in which each of $R^1$ and $R^3$ is methyl or t-butyl and each of $R^2$ and $R^4$ is t-butyl.

Typical alkylene groups from which X and Y can be selected are 2,2,4-trimethyl-1,6-hexylene, 2,4,4-trimethyl- 1,6-hexylene, 2-ethyl-1,3-hexylene, 2,2-dimethyl-1,3-hexylene, 2,2,4-trimethyl-1,3-pentylene, 2,2-dimethyl-1,3-propylene, pentyl-1,2-ethylene, 1-hexyl-1,12-dodecylene, 3-methyl-2,4-heptylene, 2-ethyl-2-butyl-1,3-propylene, 2,2-diethyl-1,3-propylene, 2-methyl-2-propyl-1,3-propylene, 1,4-dimethyl-1,4-butylene, 1,2,3-trimethyl-1,3-propylene and 1,3-dimethyl-1,3-propylene.

Esters of 3,5-dialkyl-4-hydroxyphenylalkanoic acids and alkanepolyols are described in Ser. No. 861,475. Many of these compounds are crystalline or vitreous solids which are highly effective stabilizers against thermo-oxidative ageing, i.e., they are solid antioxidants. Moreover they generally have only limited solubility in those solvents employed technically in large amounts, such as aliphatic hydrocarbons.

These properties are highly advantageous in many applications but represent disadvantages in others. Thus it is extremely difficult to utilize these compounds in technical processes in which the additives are pumped, proportioned and fed in fluid form, for example in solution polymerization processes.

The mixtures provided by the present invention are not only very suitable for the stabilization of organic material, they are liquids which can be pumped, proportioned and fed, or are very soluble in organic solvents, so that they can be employed in the form of highly concentrated solutions.

The mixtures of the invention can be obtained by reacting compounds of the formula:

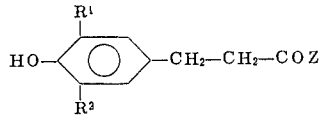

wherein Z is methoxy or ethoxy, with mixtures of alkanediols of the formula:

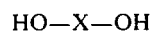

and

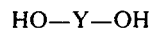

optionally in the presence of a solvent and in the presence of an acid or basic catalyst. They can also be obtained by acylating mixtures of alkanediols with the corresponding acid chloride; i.e., Z is chlorine. Alternatively, they can be produced by reacting mixtures of alkanediols with the free acid; i.e., Z is hydroxy, in the presence of an esterification catalyst. In all of these modifications of the process, advantageously the total amount of the mixture of alkanediol should be such that per mol of mixture, about 2 moles of acid, ester or acid chloride are employed.

When prepared according to the above procedure, $R^1$ will be the same as $R^3$ and $R^2$ will be the same as $R^4$.

Alternatively, the two components can be separately prepared and then physically mixed, followed by a melting operation.

Organic material which can be stabilized against thermo-oxidative decomposition with the mixtures according to the invention is primarily polymeric material, such as polyolefines, preferably α-olefine polymers such as polypropylene, optionally cross-linked polyethylene, polyisobutylene, polymethylbutene-1, polymethylpentene-1, polybutene-1, polyisoprene, polybutadiene; copolymers of monomers, such as ethylene/propylene copolymers, propylene/butene-1 copolymers, propylene/isobutylene copolymers, styrene/butadiene copolymers, as well as terpolymers of ethylene and propylene with a diene such as, for example, hexadiene, dicylcopentadiene or ethylidene-norbornene; mixtures of the above mentioned homopolymers such as, for example, mixtures of polypropylene and polyethylene, polypropylene and polybutene-1, polypropylene and polyisobutylene. Preferred are polypropylene as well as mixtures thereof and the copolymers containing propylene units; copylymers and graft polymers of styrene and butadiene with acrylonitrile, acrylic and methacrylic acid esters, optionally with vinyl esters or vinyl chloride; natural polymers such as rubber; and polycondensation products such as polycarbonate, polyamides, polyesters, polyacetals, polyurethanes. In addition, high molecular monomeric materials such as, for example, mineral oils; esters, for example, animal and vegetable fats, oils and waxes, and oils and waxes with a synthetic ester base are also stabilized according to the present invention.

The mixtures are incorporated in the substrates in a concentration of 0.01 to 5 percent by weight calculated on the material to be stabilized, preferably 0.05 to 1.5 percent and especially 0.1 to 0.8 percent, by weight, calculated on the material to be stabilized.

The incorporation can be effected before or after polymerization, or before or after molding, for example, by mixing the mixtures according to the invention and optionally other additives into the melt or solution of polymers by conventional methods. The dissolved or dispersed compounds may also be applied to the polymers, with optional subsequent evaporation of the solvent. It is a particular advantage that the mixtures according to the invention, as such or as concentrated solutions, optionally at raised temperatures, can be pumped through pipes and fed in measured amount into the polymerization or finishing process.

Other additives which may be employed together with the mixtures according to the invention are the following:

i. antioxidants of the hydroxyaryl and aminoaryl classes such as for example:
2,2'-thio-bis-(4-methyl-6-tert-butylphenol),
4,4'-thio-bis-(3-methyl-6-tert-butylphenol),
2,2'-methylene-bis-(4-methyl-6-tert-butylphenol),
2,2'-methylene-bis-(4-ethyl-6-tert-butylphenol),
4,4'-methylene-bis-(2-methyl-6-tert-butylphenol),
4,4'-butylidine-bis-(3-methyl-6-tert-butylphenol),
2,2'-methylene-bis-[4-methyl-6-($\alpha$-methylcyclohexyl)-phenol],
2,6-di-(2-hydroxy-3-tert-butyl-5-methylbenzyl)-4-methylphenol,
2,6-di-tert-butyl-4-methylphenol,
1,1,3-tris-(2-methyl-4-hydroxy-5-tert-butyl-phenyl)-butane,
1,3,5-trimethyl-2,4,6-tris-(3,5-di-tert-butyl-4-hydroxybenzyl)-benzene,
2,4-bis-octylmercapto-6-(4-hydroxy-3,5-di-tert-butylanilino)-s-triazine,
2,4-bis-(4-hydroxy-3,5-di-tert-butylphenoxy)-6-octylmercapto-s-triazine,
1,1-bis-(4-hydroxy-2-methyl-5-tert-butyl-phenyl)-3-dodecylmercapto-butane,
4-hydroxy-3,5-di-tert-butylbenzyl-phosphonic acid esters, such as the dimethyl, diethyl or dioctadecyl ester,
2-(3-methyl-4-hydroxy-5-tert-butylbenzyl)-malonic acid dioctadecyl ester,
S-(3,5-dimethyl-4-hydroxyphenyl)-thioglycolic acid octadecyl ester,
esters of 2,2-bis-(3,5-di-tert-butyl-4-hydroxybenzyl)-malonic acid, such as the didodecyl ester, the dioctadecyl ester and the 2-dodecyl-mercapto-ethyl ester,
phenyl-1-naphthylamine,
phenyl-2-naphthylamine,
N,N'-diphenyl-p-phenylenediamine,
N,N'-di-2-naphthyl-p-phenylenediamine,
N,N'-di-sec-butyl-p-phenylenediamine,
6-ethoxy-2,2,4-trimethyl-1,2-dihydroquinoline,
6-dodecyl-2,2,4-trimethyl-1,2-dihydroquinoline,
mono- and di-octyliminodibenzyl,
polymerized 2,2,4-trimethyl-1,2-dihydroquinoline.

ii. UV-absorber and light protection agents such as:

a. 2-(2'-hydroxyphenyl)-benzotriazoles, for example the 5'-methyl, 3',5'-di-tert-butyl, 5'-tert-butyl, 5-chloro-3',5'-di-tert-butyl, 5-chloro-3'-tert-butyl-5'-methyl, 3',5'-di-tert-amyl, 3'-methyl-5'-$\beta$-methoxycarbonylethyl, 5-chloro-3'and 5'-di-tert-amyl derivatives;

b. 2,4-bis-(2'-hydroxyphenyl)-6-alkyl-s-triazines, for example the 6-ethyl or 6-undecyl derivative;

c. 2-hydroxy-benzophenones, for example the 4-hydroxy, 4-methoxy-, 4-octoxy, 4-decyloxy, 4-dodecyloxy, 4,2',4'-tri-hydroxy or 2'-hydroxy-4,4'-dimethoxy derivative;

d. 1,3-bis-(2'-hydroxybenzoyl)-benzenes, for example 1,3-bis-(2'-hydroxy-4'-hexyloxybenzoyl)-benzene, 1,2-bis-(2'-hydroxy-4'-octyloxybenzoyl)-benzene, 1,3-bis-(2'-hydroxy-4'-dodecyloxybenzoyl)-benzene;

e. aryl esters of optionally substituted benzoic acids such as, for example
phenyl salicylate, octylphenyl salicylate, benzoyl resorcinol, dibenzoyl resorcinol, the 2,4-di-tert-butyl phenyl or octadecyl ester of 3,5-di-tert-butyl-4-hydroxybenzoic acid.

f. acrylates, for example
$\alpha$-cyano-$\beta$,$\beta$-diphenylacrylic acid ethyl or iso-octyl ester, $\alpha$-methoxycarbonyl-cinnamic acid methyl ester, $\alpha$-cyano-$\beta$-methyl-p-methoxy-cinnamic acid methyl or butyl ester, N-($\beta$-carbomethoxy-vinyl)-2-methylindoline;

g. nickel compounds, for example
nickel complexes of 2,2'-thio-bis-(4-tert-octylphenol), such as the 1:1 and 1:2 complexes, optionally with other ligands such as n-butylamine;
nickel complexes of bis-(4-tert-octylphenyl)-sulphone, such as the 2:1 complex, optionally with other ligands such as 2-ethyl-caproic acid;
nickel dibutyl dithiocarbamate, nickel salts of 4-hydroxy-3,5-di-tert-butylbenzyl-phosphonic acid monoalkyl esters such as the methyl, ethyl or butyl ester, the nickel complex of 2-hydroxy-4-methyl-phenyl-undecyl-ketoxime;

h. oxalic acid diamides, for example
4,4'-di-octyloxyoxanilide,
2,2'-di-octyloxy-5,5'-di-tert-butyl-oxanilide,
2,2'-di-dodecyloxy-5,5'-di-tert-butyl-oxanilide;

iii. Phosphites, such as
triphenyl phosphite,
diphenylalkyl phosphites,
phenyldialkyl phosphites, trinonylphenyl phosphite,
trilauryl phosphite,
trioctadecyl phosphite,
3,9-di-isodecyloxy-2,4,8,10-tetraoxa-3,9-diphosphaspiro-(5,5)-undecane,
tri-(4-hydroxy-3,5-di-tert-butylphenyl)-phosphite;

iv. nucleating agents, such as
4-tert-butylbenzoic acid, adipic acid and diphenylacetic acid;

v. peroxide decomposes, such as
esters of β-thio-dipropionic acid, for example the lauryl, stearyl, myristyl or tridecyl ester; salts of 2-mercapto-benzimidazole, for example the zinc salt, diphenyl thiourea;

vi. metal deactivators, such as
oxanilide, dicarboxylic acid dihydrazides, dicarboxylic acid-bis-phenyl hydrazides, salicylic acid hydrazide, N-salicyloyl-N'-salicylidene hydrazine,
bis-salicyloyl-dicarboxylic acid dihydrazides,
bis-acylated dicarboxylic acid dihydrazides,
salicyloyl-hydrazinotriazines;

vii. other additives such as antistatics, fire retarding agents, asbestos, glass fibers, kaolin, talcum, blowing agents, carbon black, plasticizers, dying auxiliaries, dyestuffs, pigments, vulcanization accelerating agents and other additives conventionally used in the rubber industry, agents to lower the cold setting point, agents to protect against corrosion and rusting, dispersing agents and anti-foaming agents.

The following examples will serve to further typify the nature of the present invention without being a limitation on the scope thereof. Temperature is expressed in degrees Centigrade.

EXAMPLE 1

Sixty-four grams of a mixture of about 70 percent by weight of 2,4,4-trimethyl-1,6-hexane diol and about 30 percent by weight of 2,2,4-trimethyl-1,6-hexane diol together with 234 g of methyl 3-(3,5-di-tert-butyl-4-hydroxyphenyl)-propionate are placed in a three-necked flask fitted with a fractionating column and melted at 80° with the introduction of nitrogen. To this melt is then added 0.8 g of lithium amide. The mixture is heated with stirring, first at normal pressure, then under vacuum (about 12 mm) until the methanol ceases to be distilled. Two grams of glacial acetic acid are then added to the reaction mixture and the mixture is filtered. After filtering, a clear, light yellow viscous liquid is obtained which consists essentially of a mixture of about 70 percent by weight of 2,4,4-trimethyl-1,6-hexanediol-bis-[3-(3,5-di-tert-butyl-4-hydroxyphenyl)propionate] and about 30 percent by weight of 2,2,4-trimethyl-1,6-hexanediol-bis-[3,5-di-tert-butyl-4-hydroxyphenyl)propionate] (Stabilizer No. 1).

EXAMPLE 2

If the trimethylhexane diol isomer mixture of Example 1 is replaced by a mixture of threo-2-ethyl-1,3-hexanediol and erythro-2-ethyl-1,3-hexanediol in a ratio of about 1:1 and by a mixture of 2,2,4-trimethyl-1,3-pentane diol and 2,2-dimethyl-1,3-hexanediol in a ratio of about 4:6, there are respectively obtained upon completion of the steps described therein a mixture of about 50 percent of erythro-2-ethyl-1,3-hexane diol-bis-[3-(3,5-di-tert-butyl-4-hydroxyphenyl)-propionate] and about 50 percent of threo-2-ethyl-1,3-hexanediol-bis-[3-(3,5-di-tert-butyl-4-hydroxyphenyl)-propionate] (Stabilizer No. 2) and a mixture of about 40 percent of 2,2,4-trimethyl-1,3-pentanediol-bis-[3-(3,5-di-tert-butyl-4-hydroxyphenyl)-propionate] and about 60 percent of 2,2-dimethyl-1,3-hexanediol-bis-[3-3,5-di-tert-butyl-4-hydroxyphenyl)-propionate] (Stabilizer No. 3), respectively, in the form of yellowish, viscous liquids.

EXAMPLE 3

When methyl 3-(3,5-di-tert-butyl-4-hydroxyphenyl)-propionate of Example 1 is replaced by an equimolar amount of methyl 3-(3-methyl-4-hydroxy-5-tert-butylphenyl)-propionate, and otherwise the same procedure is followed, a mixture of the 2,2,4- and 2,4,4-trimethyl-1,6-hexane diol-bis-[3-(3-methyl-4-hydroxy-5-tert-butylphenyl)-propionates] in a ratio of about 3:7 in the form of a clear, light yellow viscous liquid (Stabilizer No. 4) is obtained.

EXAMPLE 4

Solubility in aliphatic hydrocarbons

Equal parts by weight of n-hexane and one of the stabilizers listed in the following Table I are mixed, the mixture is heated for one hour with stirring to 35°, then stirred for 10 hours at 20° in a thermostat and then filtered. The filtrate is a saturated solution of the stabilizer in n-hexane, the amount of stabilizer contained therein being determined by concentrating by evaporation and weighing the residue. The solubilities in a typical aliphatic hydrocarbon of the stabilizers prepared in Examples 1–3 are given in Table I in grams per 100 g of solvent:

TABLE I

| Stabilizer No. | Solubility (g/100 g of hexane) |
|---|---|
| 1 | 100 |
| 2 | 100 |
| 3 | 100 |
| 4 | 100 |

EXAMPLE 5

Stabilizing of polypropylene
a. Preparation of the test samples

One hundred parts of polypropylene (melt index 3.2 g) are kneaded in a Brabender plastograph for 10 minutes at 200° with the stabilizer of Example 1. The resultant mass is then pressed in a platen press at a plating temperature of 260° to form sheets of 1 mm thickness from which strips 1×17 cm are cut.

b. Test

The effectiveness of the additives is determined by heat ageing the sheets in an air-circulation oven at 135° and 149° respectively.

The beginning of visible decomposition of the test sample is taken as end point of the test.

c. Results

TABLE II

| Stabilizer | Time until decomposition in days | |
|---|---|---|
| | 135° | 149° |
| without stabilizer | 1 | <1 |
| 0.2% Stabilizer 1 | 158 | 39 |
| 0.1% Stabilizer 1 +0.3% dilaurylthio-dipropionate | 228 | 45 |

EXAMPLE 6

Stabilization of synthetic rubber EPDM
a. Preparation of the test samples

One hundred parts of EPDM (composition: 46.5 percent of ethylene, 50 percent of propylene and 3.5 percent of ethylidenenorbornene) containing no stabilizer, are kneaded with 0.1 part of one of the additives listed in the following table in a Brabender plastograph for 30 minutes at 150° and 60 revolutions per minute.

b. Test by processing in a plastograph

During the kneading process, after 10, 20 and 30 minutes, 1-gram samples are taken and tested for the amount which is insoluble in toluene (gel content). One gram of the test material in 50 ml of toluene is stirred for 20 hours at room temperature and filtered over glass wool. The filtrate is concentrated by evaporation and the residue weighed. The difference between the original weight and the second weighing corresponds to the gel content. The gel content is given in Table III in per cent of the original weight of the test sample.

The oxidative damage of the polymers during the processing is manifested as cross-linking and thus as an increase of the gel content.

TABLE III

| Stabilizer No. | gel content after processing for | | |
|---|---|---|---|
| | 10' | 20' | 30' |
| without stabilizer | 10% | 29% | 39% |
| 1 | <1% | 1% | 24% |
| 2 | <1% | 2% | 28% |

EXAMPLE 7

To a reaction vessel equipped with an agitator, Dean-Stark trap and nitrogen inlet are added 585 parts of methyl 3-(3,5-di-t-butyl-4-hydroxyphenyl)propionate, 99 parts of a 30:70 mixture of the isomeric 2,4,4-trimethyl-1,6-hexanediol and 2,2,4-trimethyl-1,6-hexanediol and 1.33 parts of lithium hydride. The reactants are heated at 125–150°C for 1 ½ hours at atmospheric pressure under nitrogen and then for an additional 4 hours at 110–120°C at 0.2 to 0.5 mm. One thousand parts by volume of hexane are then added after cooling and the mixture then warmed with stirring and filtered. The filtrate is treated with 15 parts by volume of glacial acetic acid with stirring, followed by an excess of sodium carbonate with stirring. After refiltering, the filtrate is freed of solvent and volatile impurieies by slowly heating under vacuum. The residue constitutes the product, a 30:70 mixture of 2,4,4-trimethyl-1,6-hexanediol bis[3-( 3,5-di-t-butyl-4-hydroxy-phenyl)propionate] and 2,2,4-trimethyl-1,6-hexanediol bis[ 3,5-di-t-butyl-4-hydroxyphenyl)propionate] as a syrup.

What is claimed is:

1. A physical mixture comprising:
a. A compound of the formula:

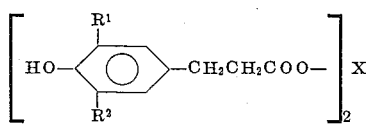

with b. a compound of the formula:

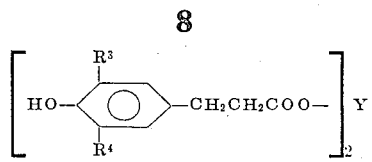

wherein each of $R^1$ and $R^3$, independent of the other, is methyl, isopropyl, sec-butyl or tert.-butyl;

each of $R^2$ and $R^4$, independent of the other is isopropyl, sec-butyl or tert.-butyl; and X and Y are non-identical residues of an alkane diol of from three to 18 carbon atoms and having two non-geminal valence bonds, the ratio in the mixture of one compound to the other being from 1:1 to 9:1.

2. A mixture according to claim 1 wherein
$R^1$ and $R^3$ are methyl or tert-butyl,
$R^2$ and $R^4$ are tert-butyl, and
X and Y are non-identical residues of an alkane diol of from three to 12 carbon atoms.

3. A mixture according to claim 1 wherein
$R^1$, $R^2$, $R^3$ and $R^4$ are tert-butyl, and
X and Y are non-identical residues of an alkane diol of from five to nine carbon atoms.

4. A mixture according to claim 1 which consists of 2,2,4-trimethyl-1,6-hexanediol bis-[3-(3,5-di-tert-butyl-4-hydroxyphenyl)-propionate] and 2,4,4-trimethyl-1,6-hexanediol bis-[3-(3,5-di-tert-butyl-4-hydroxyphenyl)-propionate].

5. A mixture according to claim 1 which consists of erythro-2-ethyl-1,3-hexanediol-bis [3-(3,5-di-tert-butyl-4-hydroxyphenyl)propionate] and threo-2-ethyl-1,3-hexanediol-bis-[3-(3,5-di-tert-butyl-4-hydroxyphenyl)propionate].

6. A mixture of a compound of the formula

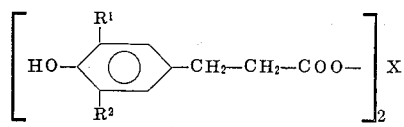

and a compound of the formula

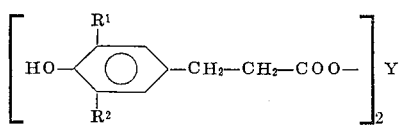

in which
$R^1$ is methyl, isopropyl, sec-butyl or tert-butyl,
$R^2$ is isopropyl, sec-butyl or tert-butyl, and
each of X and Y is a branched chain alkylene radical having three to 18 carbon atoms, the two bonds of which do not originate from the same carbon atom, provided X and Y are not identical, the ratio in the mixture of one compound to the other being from 1:1 to 9:1.

* * * * *